July 2, 1935.  L. G. TUBBS  2,006,527

RECLAIMING NONSHATTERABLE GLASSES

Filed Feb. 24, 1934  2 Sheets-Sheet 1

Inventor

Llewellyn G. Tubbs.

By Howard J. Whelan.

Attorney

July 2, 1935. L. G. TUBBS 2,006,527
RECLAIMING NONSHATTERABLE GLASSES
Filed Feb. 24, 1934 2 Sheets-Sheet 2

Inventor
Llewellyn G. Tubbs.
By Howard J. Whelan.
Attorney

Patented July 2, 1935

2,006,527

UNITED STATES PATENT OFFICE 2,006,527

RECLAIMING NONSHATTERABLE GLASSES

Llewellyn G. Tubbs, Baltimore, Md.

Application February 24, 1934, Serial No. 712,706

4 Claims. (Cl. 49—81)

The invention is a method of and apparatus for reclaiming the materials of the so-called non-shatterable glasses.

It has, among its objects, to provide for the reclaiming of the glass and binder used in making non-shatterable glass, which includes the glass itself and the celluloid or other binder used; to have a machine that will break up the glass and segregate it from the binder material; to have an arrangement for adjusting the machine for the various classes of work and provide for more adaptable operation; to have an arrangement for processing the materials after they have passed through the primary stage and thereby make the segregation more complete; and other objects that will become apparent as the invention is more fully set forth.

At the present time, scrap non-shatterable glass is of no practical value. The materials are so mixed up in the scrap and do not permit the glass to be reused because of the binder mixed up in it, or the binder because of the particles of glass in it. With this invention, the scrap glass is placed in a machine which has rolls that contact with the glass surface but do not reach the binder, this breaks the glass without injuring the lamination of binder, which passes out in a layer to a solvent tank. Strippers are provided for cleaning off the glass as it is broken off the binder lamination.

In the drawings which illustrate by way of example an embodiment of this invention:—

Figure 1:
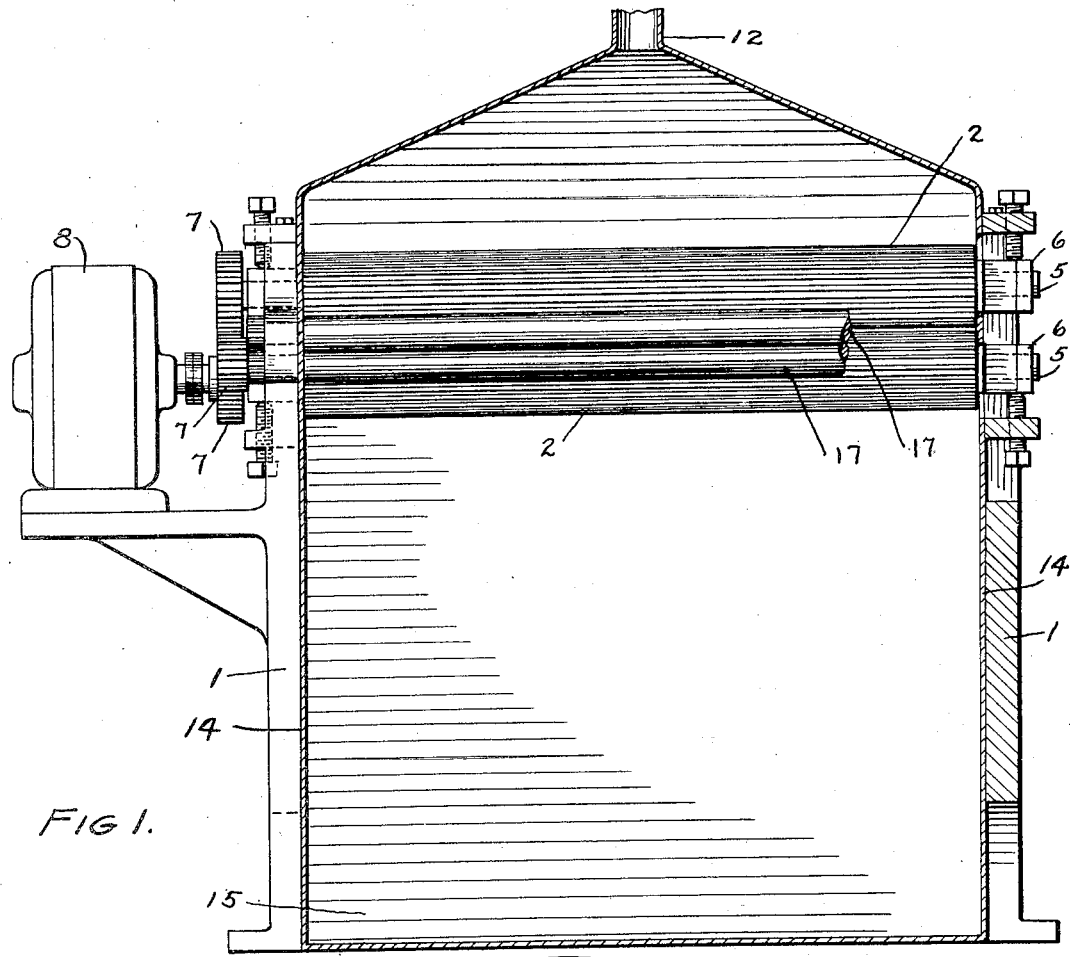
Figure 1 is an end view of the machine for reclaiming glass, and embodying this invention.
Figure 2:
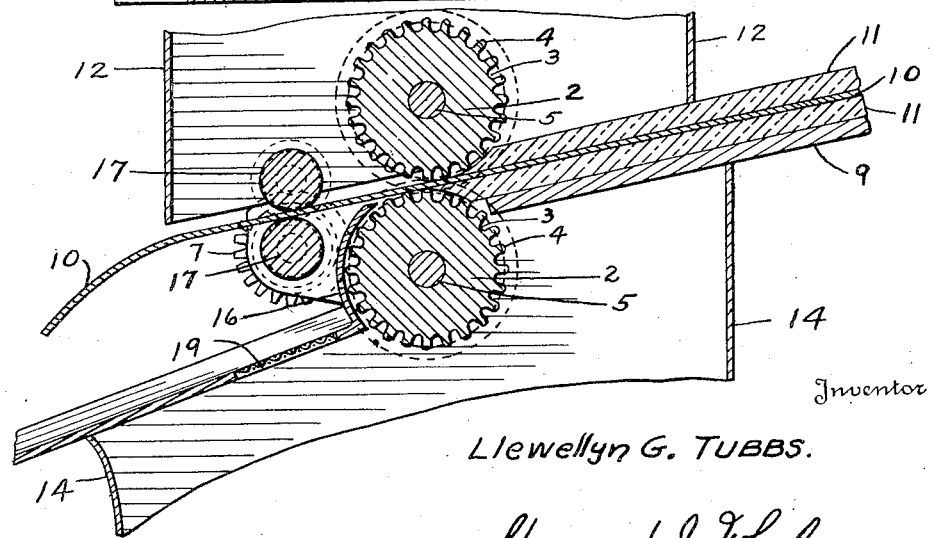
Figure 2 is an enlarged section of breaking-gear and roll mechanism of Figure 1.
Figure 3:
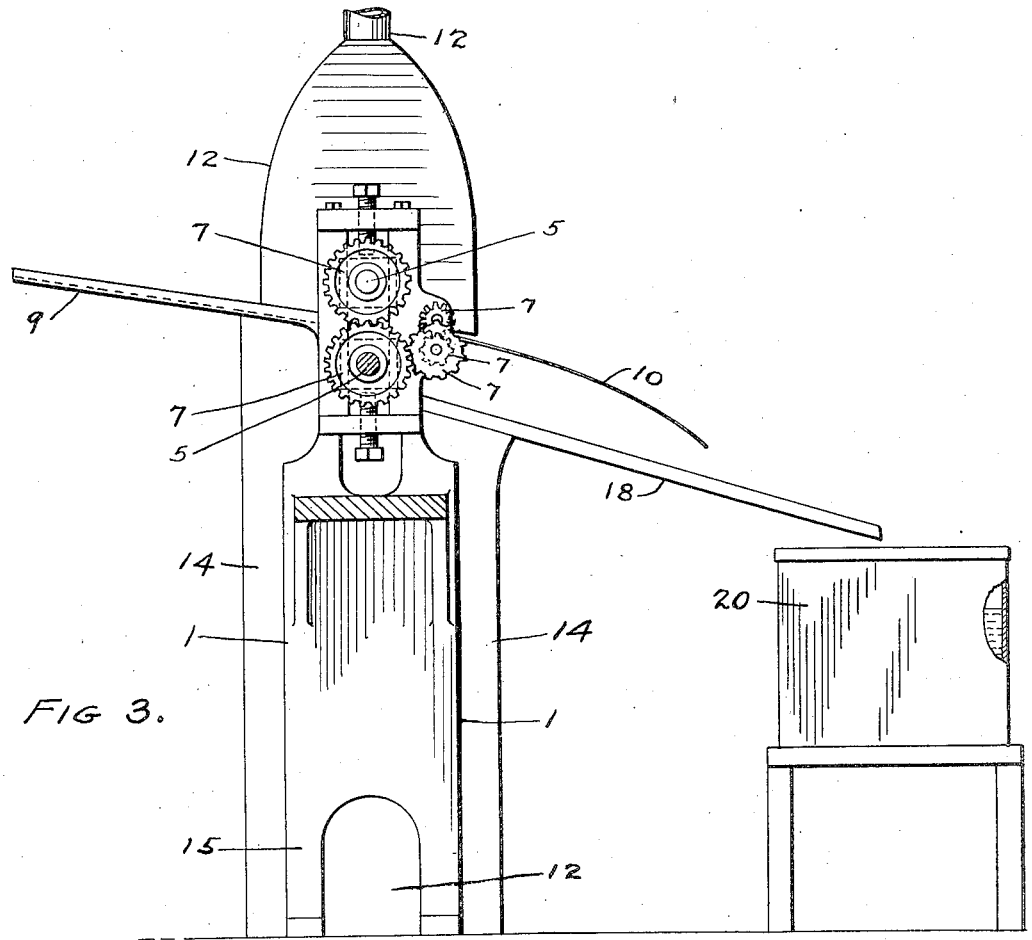
Figure 3 is a side view of Figure 1 with parts sectioned to permit the operation to be more closely understood.
Figure 5:
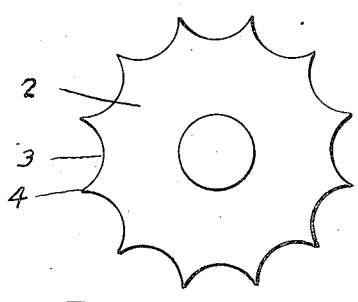
Figure 6:
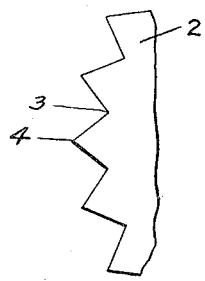
Figure 7:
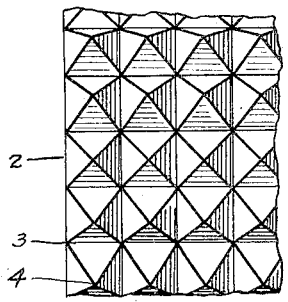
Figure 4:
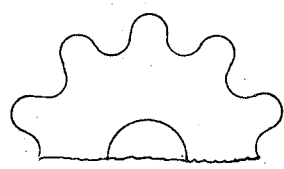
Figure 4 is a detail of the breaking-gear preferably used in this mechanism.

Figure 5 is a modified form of breaking-gear.
Figure 6 is a modified form of breaking-gear.
Figure 7 is a modified form of breaking-gear.

Similar reference characters refer to similar parts throughout the drawings.

In the construction shown in the drawings, 1 represents a frame of conventional form, on which two breaking-gears 2 are used to make contact with the glass to be reclaimed. These breaking-gears are special types of rolls preferably provided with surfaces that are fluted with grooves 3 and raised projections 4. These raised projections are provided with pointed, rounded, or diamond pyramidical points, which crush and splinter the glass surfaces as they come into contact, as same pass through between the breaking gears. The breaking-gears are mounted on shafts 5 which run in adjustable bearings 6, and are provided with a suitable train of gearing 7 and source of power or motor 8.

A table 9 is mounted on the frame and guides the glass to be reclaimed to the breaking-gears, the latter being spaced to permit the binder 10 to pass freely through while the glass 11 is crushed by the diamond pyramidical points. A suction funnel 12 is placed to catch and suck in the dust from the machine. As the glass is crushed by the breaking gears it flows through a channel box 14 into a bin 15, where it collects for disposal. Such glass as passes through the breaking-gears, is swept off with strippers 16 and falls also into the bin 15. The binder passes through and is caught by rolls 17 that carry it to a solvent tank 20, where the binder is liquefied and drops any particles of glass adhering to it. A chute 18 is provided as shown to carry or guide the binder on its way to the solvent tank, part of the chute having a screen 19 in it for allowing any loose particles of glass to fall into the bin.

As the glass passes through the process it is segregated into the loose glass and binder lamination, it enables the glass to be reused for remelting while the liquefied binder can be drawn off and reused by celluloid factories or others interested in the particular binder reclaimed.

While, but one form of the invention is shown in the drawings, it is not desired to limit this invention to this particular form or in any other way, otherwise than limited by the prior art, as it is appreciated that other devices might be used that would employ the same principles and come within the scope of the appended claims.

I claim:

1. A reclaimer for non-metallic service of the class described comprising in combination a frame, a plurality of serrated breaking-gears having teeth on the surfaces thereof, an adjustable device for controlling the spacing of the breaking-gears and their contact with the salvage glass put therethrough, all mounted on the said frame, a table for carrying the salvage material to the breaking-gears, a funnel for catching the crushed glass, strippers for brushing off glass from the binder material, a chute for carrying off the binder material having a screen therein to permit loose particles of glass to pass through to said funnel, a plurality of guide rolls for carrying the binder from the chute, and a solvent tank for receiving the binder and liquefying same and clearing loose particles of solid material therefrom.

2. A reclaiming machine for non-metallic service, comprising a plurality of breaking-gears having supporting shafts, means for mechanically connecting the shafts together to permit coincident operation with each other, a table for taking salvage material and guiding same to said breaking-gears, strippers adapted to make frictional contact with the salvage material passing through said breaking-gears and brush same, a guide funnel disposed to catch particles of salvage material dropping from same, means for carrying off dust from the operation of the machine, a chute for carrying off binder salvage passing through the breaking-gears, a screen in the chute for allowing loose particles to pass therethrough, a plurality of rolls connected with the breaking-gear mechanism for carrying the binder; means for further separating the binder and remaining attached particles of glass, means for operating the breaking-gears and rolls, and a frame for supporting the said parts.

3. A reclaiming machine for glass panels bound together with a lining of cellulosic material and forming one sheet of processed glass, the combination of a plurality of rolls spaced apart with the path of the glass in between, said rolls having grooves relatively small and provided with raised projections having pyramidical points thereon adapted to contact the surface of the glass to be reclaimed, rolls for pulling the lining through and guiding same, means for cleaning off the broken glass from the lining, and means for supporting the said rolls, means and parts, and for driving the same.

4. A reclaiming machine for glass panels bound together with a lining of cellulosic material and forming one sheet of processed glass, the combination of a plurality of rolls spaced apart with the path of the glass in between, said rolls having grooves relatively small and provided with raised projections having pyramidical points thereon adapted to contact the surface of the glass to be reclaimed, means for cleaning off the broken glass from the lining and means for supporting the said rolls, means and parts, and for driving the same.

LLEWELLYN G. TUBBS.